United States Patent
Fujii

(10) Patent No.: US 6,899,487 B2
(45) Date of Patent: May 31, 2005

(54) INK COMPOSITION FOR OIL-BASED BALLPOINT PEN AND OIL-BASED BALLPOINT PEN USING THE INK

(75) Inventor: Takeshi Fujii, Gunma (JP)

(73) Assignee: Kabushiki Kaisha Pilot Corporation, Tokyo (JP)

( * ) Notice: Subject to any disclaimer, the term of this patent is extended or adjusted under 35 U.S.C. 154(b) by 0 days.

(21) Appl. No.: 10/669,004

(22) Filed: Sep. 24, 2003

(65) Prior Publication Data

US 2004/0114987 A1 Jun. 17, 2004

(30) Foreign Application Priority Data

Sep. 25, 2002 (JP) ........................................ 2002-278893

(51) Int. Cl.[7] .............................................. C09D 11/18
(52) U.S. Cl. ................. 401/215; 106/31.26; 106/31.28; 106/31.85; 106/31.89
(58) Field of Search ................................ 401/209, 215, 401/216; 106/31.26, 31.28, 31.57, 31.59, 31.6, 31.85, 31.89

(56) References Cited

U.S. PATENT DOCUMENTS 6,075,070 A 6/2000 Lin et al.
6,390,710 B1 * 5/2002 Miyamoto .................. 401/215

FOREIGN PATENT DOCUMENTS

| JP | 06-313143 A1 | 11/1994 |
|---|---|---|
| JP | 06-313144 A1 | 11/1994 |
| JP | 07-196972 A1 | 8/1995 |
| JP | 09-48941 A1 | 2/1997 |
| JP | 09-503819 A1 | 4/1997 |
| JP | 10-158568 A1 | 6/1998 |
| JP | 2000-212496 A1 | 8/2000 |
| JP | 2001-271017 A1 | 10/2001 |
| JP | 2001-271018 A1 | 10/2001 |
| JP | 2001-279154 A1 | 10/2001 |
| JP | 2001-294796 A1 | 10/2001 |
| WO | WO-95/11283 A1 | 4/1995 |

* cited by examiner

Primary Examiner—Gregory L. Huson
Assistant Examiner—Peter deVore
(74) Attorney, Agent, or Firm—Rader, Fishman & Grauer PLLC

(57) ABSTRACT

An ink composition for oil-based ballpoint pens is comprised of a solvent, a colorant and an anti-corrosive wetting agent. The solvent is a water containing water-in-oil-type organic solvent. The colorant is a combination of a dye and a pigment, wherein the pigment is dispersed in the ink with a nonionic surfactant. The anti-corrosive wetting agent is a phosphate based surfactant. An oil-based ballpoint pen using the above ink is also included.

7 Claims, No Drawings

INK COMPOSITION FOR OIL-BASED BALLPOINT PEN AND OIL-BASED BALLPOINT PEN USING THE INK

TECHNICAL FIELD OF THE INVENTION

The present invention relates to a ballpoint pen filled with an oil-based ink.

BACKGROUND OF THE INVENTION

General oil-based ballpoint pens that have been used have inks employing as solvents ethylene glycol monophenyl ether as a low-boiling solvent, and higher alcohols represented by benzyl alcohol and the like, using dyes soluble in these solvents as colorants, and adjusted to have a viscosity of 6,000 to 20,000 mPa·s (20° C.). In addition, these general oil-based ballpoint pens are designed such that the ink consumption per 100 m of writing duration is, for example, about 10 mg for φ0.5 mm of diameter of a writing point ball, about 20 mg for φ0.7 mm, and about 30 mg for φ1.0 mm in view of strike-through of handwriting, handwriting drying characteristics, ink dangling from a writing point portion and the like. That is, for the ink consumption of a general oil-based ballpoint pen, the writing point portion is designed such that where the ball diameter is X (mm) and the ink consumption per 100 m of writing duration is Y (mg), the requirement of Y≦30X is satisfied, and the requirement of Y≦35X is satisfied even if the ink consumption is set to a higher level. For conventional inks, if the ink consumption is greater than this, there arise problems such as strike-through of handwriting, poor handwriting drying characteristics and ink dangling.

Ink compositions represented by the ink viscosity of the oil-based ballpoint pens described above are all designed in view of the functionality of ballpoint pens, and thus have inevitability. That is, since the ink consumption cannot be increased, a very high concentration of colorant is inevitably employed for maintaining a certain level of handwriting density, and solvent systems are thus limited for maintaining stability of the high concentration of colorant. Since such inks are employed, there are limitations on ink properties and designs of writing point portions as described above.

In this way, the conventional oil-based ballpoint pen has an ink viscosity of 6,000 to 20,000 mPa·s (20° C.), and therefore has rotational resistance of a ball at the time when writing is performed, and does not necessarily have a reduced writing pressure and satisfactory writing feeling. This accounts for the fact that an oil-based ballpoint pen is inferior in writing feeling to a water-based ballpoint pen.

As techniques for solving the problems, inks having an increased viscosity at the time when writing is not performed, and having a reduced viscosity due to ball rotation at the time when writing is performed, as pseudo-plasticity in ink viscosity, are described in Japanese Patent Laid-Open No. 6-313143, Japanese Patent Laid-Open No. 6-313144, Japanese Patent Laid-Open No. 7-196972 and Japanese Patent Laid-Open No. 9-48941.

However, even if the pseudo-plasticity in ink viscosity is imparted to the ink to satisfy both the dangling performance and writing feeling at the same time, limitations on the ink consumption are not eliminated, and thus the problem such that the oil-based ballpoint pen has faint handwriting compared to the water-based ballpoint pen is not solved.

On the other hand, if a dye is employed as a colorant, there arise problems in alcohol resistance and light resistance of handwriting, and studies have been made in a variety of ways. They include employment of pigments disclosed in, for example, Japanese Patent Laid-Open No. 2000-212496, Japanese Patent Laid-Open No. 2001-271017, Japanese Patent Laid-Open No. 2001-279154 and the like. Employment of a pigment in the oil-based ballpoint pen, including employment of a pigment alone and in combination with a dye, has been considered since long ago, and may be well known, but the oil-based ballpoint pen should employ a very high concentration of colorant for maintaining a certain level of handwriting density as described above, and it is thus difficult to keep a uniform state if a pigment insoluble in a solvent is employed.

Furthermore, efficacy in improving the dangling performance by partly replacing a dye with a pigment as a colorant is described in Japanese Patent Laid-Open No. 2001-271018 and Japanese Patent Laid-Open No. 2001-294796, but there is a disadvantage that stability with time is not improved when a pigment is employed due to the problem described above.

Japanese Patent KOHYO Laid-Open No. 9-503819 describes inks with water added thereto or with no water added thereto, but does not so much as indicate that the ink is a solvent solution, which is a water-in-oil-type emulsion.

Employment of a pigment as a colorant is effective means in improving handwriting fastness properties as described above. Furthermore, the applicant of this patent application has disclosed an ink having the improved writing feeling and handwriting density compared to conventional oil-based ballpoint pens by dispersing water in a solvent, in Japanese Patent Laid-Open No. 10-158568, entitled "water-in-oil dispersion ink", and the dye is a very effective essential component in the sense that the functionality of the oil-based ballpoint pen is satisfied as described above, but has a problem such that the ink included in the ballpoint pen is poor in color visibility in terms of outward appearance due also to introduction of the dye in a high concentration in the ink. For example, a red color does not provide a red color but provides a blackish color in terms of the sense of vision. In this respect, employment of a pigment can ensure adequate outward visibility.

However, employment of a pigment has a very serious problem in stability of the ink with time. The ink for oil-based ballpoint pens has a very high concentration of solids as described above, and particularly the ink in a writing point portion has a small volume and is exposed to various environments. Furthermore, solvent systems are limited for satisfying the functionality of the ballpoint pen, and there are many problems to be solved for maintaining uniform dispersion of a pigment. A wide range of pigments are employed in inks for water-based ballpoint pens but in the case of oil-based ballpoint pens, difficulties concerning employment of a pigment are significantly increased due to the fact that the oil-based ballpoint pen is designed so that an ink channel of a writing point portion is extremely reduced in width, and that the content of solids such as colorant components as well as thickener components is considerably high.

Furthermore, as generally known, employment of a pigment has problems such that the writing tactility is degraded due to a hindrance to ball rotation at the time when writing is performed because of the dispersion system, a ball seat in the writing point portion is easily abraded due to the rotation of a ball, and so on.

The inventor sufficiently analyzed the above problems arising when a pigment is contained in an ink to find countermeasures, and simultaneously solved problems as to the writing tactility and handwriting density, which are inevitable problems in the oil-based ballpoint pen.

The present invention provides an ink for oil-based ballpoint pens having satisfactory handwriting fastness properties, sufficiently improved outward color visibility, satisfactory writing tactility, a satisfactory writing density and improved stability with time, and an oil-based ballpoint pen having the ink.

SUMMARY OF THE INVENTIONS

The present invention relates to an ink composition for oil-based ballpoint pens comprised of a solvent, a colorant and an anti-corrosive wetting agent, wherein the solvent is a water-in-oil-type organic solvent containing water, the colorant is a combination of a dye and a pigment, the pigment being dispersed in the ink with a nonionic surfactant, and the anti-corrosive wetting agent is a phosphate based surfactant.

The dye may be a basic dye or salt-forming dye comprised of a basic dye and an organic acid.

The viscosity of the ink at 20° C. may be 100 to 5,000 mPa·S.

The content of phosphate based surfactant may be 0.1 to 5.0 wt % based on the total amount of ink composition.

The solvent may be comprised of (a) 3.0 to 15.0 wt % of water based on the total amount of ink composition, (b) 5.0 to 40.0 wt % of organic solvent based on the total amount of ink composition, which dissolves water and is soluble in a water-insoluble polar solvent, and (c) a water-insoluble polar solvent as the rest, in which the total amount of (a) water, (b) organic solvent which dissolves water and is soluble in a water-insoluble polar solvent, and (c) water-insoluble polar solvent may be 30.0 to 75.0 wt % based on the total amount of ink composition.

The organic solvent which dissolves water and is soluble in a water-insoluble polar solvent may be an organic solvent of which the vapor pressure at 20° C. is 0.5 mmHg or greater.

The present invention also relates to such an oil-based ballpoint pen using the ink composition for oil-based ballpoint pens that the requirement of $Y \geqq 60X$, wherein $X$(mm) is a diameter of a point ball of a ballpoint pen tip and $Y$ (mg) is ink consumption weight per writing distance of 100 m, is satisfied.

The ink consumption amount per writing distance of 100 m in the present invention has been computed based on ISO 12757-2.

Furthermore, for the ink viscosity, B8H Viscometer manufactured by Tokyo Keiki Co., Ltd. was used to measure a viscosity at a rotation speed of 10 rpm of a No. 2 rotor under a circumstance of 20° C.

DETAILED EXPLANATION OF THE INVENTION

The present invention is characterized in that an ink for oil-based ballpoint pens is comprised of a composition having a water-in-oil-type organic solvent containing water as a solvent, a combination of a dye and a pigment as a colorant, the pigment being dispersed in the ink with a nonionic surfactant, and a phosphate based surfactant as an anti-corrosive wetting agent.

Employment of a pigment has considerable advantages that handwriting fastness properties are improved, the outward color visibility of the ink is improved, and so on. However, it is extremely difficult to maintain the dispersion of a pigment in an ink satisfactorily and stably due to influences by thickener components in the ink, influences by blending a very high concentration of colorant for improvement of the handwriting density, influences by additives for maintaining ink stability, and influences by a solvent system for improvement of functionality of the ballpoint pen.

As a result of conducting vigorous studies on how the effectiveness of the pigment is utilized, the inventors have found solutions as described below.

Pigment dispersion techniques include various methods as already well known, but techniques that are commonly employed in dispersion of pigments in alcohol based solvents include resin based dispersions represented by polyvinyl butyral resins and the like.

In the resin-based dispersion, however, anionic components such as polyvinyl pyrrolidone commonly employed as ink components for their contribution to effective prevention of spread like tears when writing is performed are substituted with resin based components with time, so that a pigment dispersion power is compromised, and thus the pigment is easily agglomerated and precipitated. The dry-up of the ink in a writing point portion may cause a resin as a dispersant to be denatured and thereby suffer degradation in its dispersion power, resulting in the problems described above.

Furthermore, for the oil-based ballpoint pen, the ink consumption is small, and therefore the concentration of colorant components in the ink should be extremely increased. Dispersion of a pigment in a high concentration as described above leads to degradation in stability with time, and the dry-up of the ink inevitably occurs, thus making it extremely difficult to improve the state of the ink in the writing point portion.

Furthermore, in the case of the above resin dispersion system, dispersant components themselves have a high viscosity, and therefore the viscosity is increased synergistically due to high concentration dispersion, thus making it difficult to disperse the pigment. As a matter of course, the pigment dispersion has an extremely increased viscosity, and therefore the ink is no longer suitable as an ink for oil-based ballpoint pens.

For solving the problems described above, the inventors positively employed a nonionic surfactant as dispersant of a pigment, thereby successfully solving problems associated with ionic relations with components in the ink to maintain a balance. Furthermore, an increase in viscosity during dispersion of a pigment was prevented to achieve a satisfactory performance as colorant components of the ink for oil-based ballpoint pens. Nonionic surfactants for uses as dispersants for the pigment include polyoxyethylene dinonyl phenol ether, polyoxyethylene lauryl ether, polyoxyethylene olein ether, sorbitan sesquioleate, sorbitan trioleate and polyoxyethylene sorbitan trioleate.

Furthermore, for the pigment, organic, inorganic and processed pigments, for example carbon black, phtalocyanine based pigments, azo based pigments, quinacridone based pigments, quinophthalone based pigments, threne based pigments and triphenyl methane based pigments are used.

Furthermore, the above described problems associated with use of a pigment alone as a colorant are solved by using a pigment in conjunction with a dye instead of employing a pigment alone as a colorant. The dye is inferior in handwriting fastness properties to the pigment, but is stable in the ink and has satisfactory color development characteristics. The pigment ink is essentially poor in clarity of handwriting and color development characteristics, and therefore a combination of a pigment and a dye compensates for disadvantages of the pigment and dye, and is most suitable as a colorant composition of inks for ballpoint pens.

Furthermore, the concentration of pigment can be reduced to a minimum by using a dye having satisfactory color development characteristics in conjunction with the pigment. As a result, a satisfactory state can be maintained as a pigment dispersion without causing the ink viscosity to be increased.

The dye to be employed in the present invention is not specifically limited as long as it is a general oil-soluble dye, but it is desirably a basic dye or salt-forming dye comprised of a basic dye and an organic acid having adequate color development characteristics and allowing a nonionic surfactant to sufficiently exert a dispersion effect. Examples of the basic dye or salt-forming dye comprised of a basic dye and an organic acid may include VALIFAST RED 1360 manufactured by Orient Chemical Industries Ltd. and SPILON RED C-GH and SPILON BLUE C-RH manufactured by Hodogaya Chemical Co., Ltd.

Another feature of the present invention is that water is contained as a solvent, and a phosphate based surfactant is contained in the ink.

Use of a pigment in a colorant has certain advantages. However, it has also disadvantages as described previously. One of disadvantages is that ball rotation is hindered and a ball seat is abraded when writing is performed. A fundamental cause lies in the fact that it is a pigment that has a dispersion form of colored particles, and the colored particles always exist between the ball of the writing point portion and a metal formed by a ball holder.

This problem becomes significantly serious in the case of copy writing that is an important function of the oil-based ballpoint pen. Copy writing inevitably involves high pressure writing, and a wetting environment is a boundary wetting model. If colored particles exist under the environment of the boundary wetting model, hindrance to ball rotation and abrasion of the ball seat are significantly promoted, causing degradation in writing tactility and writing failure.

The inventors found that the problem is solved by adding water and a phosphate based surfactant in the ink of the oil-based ballpoint pen. It is a well known fact that a phosphate based surfactant functions as an anti-corrosive agent in a water-based ballpoint pen. The inventors also noted this fact, and added a phosphate based surfactant in an oil-based ink, but no effect was exhibited. As a result of vigorous studies, however, the inventors could achieve a great effect by employing the phosphate based surfactant and water together in the oil-based ink. The inventors understand that this effect is ascribable to the surfactant changing its micelle structure by existence of water to considerably improve adsorption and adhesion to a metal.

That is, water is necessary for the phosphate based surfactant to function as a wetting agent in the ink for oil-based ballpoint pens, and by employing water and the phosphate based surfactant in combination, the wetting capability of the ink for oil-based ballpoint pens having a pigment contained in a colorant could be significantly improved. Thus, the solvent in the ink of the invention is a water-in-oil-type organic solvent, and by using this solvent, the phosphate based surfactant acts effectively.

The content of phosphate based surfactant that is employed in the present invention is determined according to a desired ballpoint pen in view of an ink solvent system, the structure of a writing point portion, and a preset ink consumption, and is not specifically limited, but is desirably approximately 0.1 to 5.0 wt % based on the total amount of ink composition for oil-based ballpoint pens. It has been experimentally shown that if the content is less than 0.1 wt %, a wetting capability is hard to be achieved, and if the content is greater than 5.0 wt %, drying characteristics of handwriting tend to be compromised. Phosphate based surfactants that can be employed in the present invention include alkylphenol ether phosphate, polyoxyethylene alkylphenyl phosphate and polyoxyalkylene alkyl ether phosphate.

The viscosity of the ink for oil-based ballpoint pens of the present invention is not specifically limited, but if the viscosity is less than 100 mPa·s when measured at 20° C., seepage and strike-through of writing tend to occur, and a wetting environment formed around a ball in a writing point portion becomes a boundary wetting model at the time when high pressure writing is performed to easily cause writing failure. On the other hand, if the viscosity is greater than 5,000 mPa·s when measured at 20° C., resistance to ball rotation occurs and thus writing tactility may be heavy at the time when writing is performed. Furthermore, in a ballpoint pen designed to have an increased ink consumption, permeation of the ink to the writing side tend to be slow, resulting in degradation in drying characteristics of handwriting. Thus, it is desirable that the ink viscosity when measured at 20° C. is 100 to 5,000 mPa·s.

In the present invention, writing tactility and handwriting are considerably improved by setting the ink consumption to a higher level and setting the ink viscosity to a lower level. However, such setting tends to cause handwriting seepage, degradation in handwriting drying characteristics and strike-through of handwriting. This problem is alleviated by positively employing in combination (a) water, (b) an organic solvent which dissolves water and is soluble in a water-insoluble polar solvent, and (c) a water-insoluble polar solvent.

If the ink consumption of the ballpoint pen is set to a higher level, and the ink viscosity is set to a lower level for improvement of writing tactility, 30.0 to 75.0 wt % of the (a) water, (b) an organic solvent which dissolves water and is soluble in a water-insoluble polar solvent, and (c) a water-insoluble polar solvent is incorporated in the ink based on the total amount of ink composition in view of performance trades-off such as ink dry-up, an initial writing performance and handwriting seepage, degradation in handwriting drying characteristics and strike-through of handwriting. If the total amount of (a) water, (b) an organic solvent which dissolves water and is soluble in a water-insoluble polar solvent, and (c) a water-insoluble polar solvent is less than 30 wt %, solution and dispersion of the ink composition tend to be hindered. Furthermore, if the total amount is greater than 75.0 wt %, handwriting becomes faint, and handwriting seepage, degradation in handwriting drying characteristics and strike-through of handwriting are hard to be alleviated.

In the present invention, it is an important compositional requirement to incorporate water in the solvent for the purpose of satisfying a wetting capability of the ink. Furthermore, by incorporating water in the solvent, affinity with water is improved, and effects of controlling handwriting drying characteristics, and inhibiting seepage to the handwriting side and strike-through are also exhibited. It is desirable that the content of water is 3.0 to 15.0 wt % based on the total amount of ink composition. If the content is less than 3.0 wt %, the wetting effect of the phosphate based surfactant described above is hard to be achieved, and the effect of inhibiting handwriting seepage and strike-through is hard to be achieved. Furthermore, if the content is greater than 15.0 wt %, solubilization stability of water in the solvent tends to be degraded. Therefore, it is desirable that the content of water is 3.0 to 15 wt %.

Furthermore, it is desirable that the content of organic solvent which dissolves water and is soluble in a water-insoluble polar solvent is 5.0 to 40.0 wt % based on the total amount of ink composition in view of the solubilization stability of water. If the content is less than 5.0 wt %, water cannot be held stably, and if the content is greater than 40.0 wt %, the stability of the colorant in the ink may be compromised.

Furthermore, it is preferable that an organic solvent of which the vapor pressure at 20° C. is 0.5 mmHg or greater is employed as the organic solvent which dissolves water and is soluble in a water-insoluble polar solvent because handwriting drying characteristics are further improved, and handwriting chafing characteristics are also improved.

On the other hand, if only water and the organic solvent which dissolves water and is soluble in a water-insoluble polar solvent are employed as a solvent, the stability of the colorant in the ink may be compromised, and therefore a water-insoluble polar solvent is employed as the rest.

Furthermore, if only the water-insoluble polar solvent and water are employed as a solvent in the ink, water cannot be held stably.

The water-insoluble polar solvent is not specifically limited, but alcohols and glycols such as benzyl alcohol, diethylene glycol and polyethylene glycol, and glycol ethers such as ethylene glycol monophenyl ether can be employed in view of stability of the dye and the pigment and solubilization stability of water. These compounds may be used alone or in combination of two or more types.

The organic solvent which dissolves water and is soluble in a water-insoluble polar solvent is not specifically limited, but diethylene glycol monoethyl ether, triethylene glycol monoethyl ether, propylene glycol, 1,3-butanediol and the like can be employed in view of solubilization stability of water. These compounds may be used alone or in combination of two or more types.

The organic solvent of which the vapor pressure at 20° C. is 0.5 mmHg or greater is not specifically limited, but glycol ethers such as ethylene glycol monomethyl ether, ethylene glycol monoethyl ether, ethylene glycol monobutyl ether, ethylene glycol dimethyl ether, propylene glycol monomethyl ether, propylene glycol monoethyl ether and diethylene glycol dimethyl ether, and alcohols such as methanol, ethanol, 1-propanol, 2-propanol, t-butanol, allyl alcohol, 3-methyl-1-butyne-3-ole and ethylene glycol monomethyl ether acetate can be employed in view of stability of the dye and the pigment and solubilization stability of water. These compounds may be used alone or in combination of two or more types.

For the ink consumption of the ballpoint pen of the present invention, it is desirable that where the ball diameter of a writing point ball of a ballpoint pen tip is X (mm), and the ink consumption per 100 m of writing duration is Y (mg), the requirement of $Y \geq 60X$ is satisfied. The oil-based ballpoint pen has faint handwriting because of the small ink consumption as described previously. Therefore, it is one of strategies for maintaining a certain level of handwriting density to extremely increase the concentration of colorant components in the ink. However, an effective level of handwriting density is hard to be achieved. In the present invention, it was found as a result of vigorous studies that by satisfying the requirement of $Y \geq 60X$ described above for the ink consumption of the oil-based ballpoint pen, an excellent level of handwriting density equivalent to that of the water-based ballpoint pen is achieved. Furthermore, by satisfying the requirement of $Y \geq 60X$, a wetting environment formed around a ball in a writing point portion becomes a fluid wetting environment, and thus writing tactility is considerably improved. In the case of $Y<60X$, an effective level of handwriting density is hard to be achieved. On the other hand, an indiscriminate increase in ink consumption causes a reduction in handwriting duration as a matter of course, and by satisfying preferably the requirement of $200X \geq Y \geq 60X$, a further improved effect is exhibited.

EXAMPLES

Example 1

| (Solution A) | |
| --- | --- |
| ethylene glycol monophenyl ether | 24.5 wt % |
| AIZEN SPILON BLACK GMH-S | 15.0 wt % |
| VALIFAST VIOLET 1701 | 15.0 wt % |
| carbon black | 2.0 wt % |
| nonionic surfactant (trade name: SORBON T-85) | 1.5 wt % |
| (Solution B) | |
| diethylene glycol monoethyl ether | 24.5 wt % |
| ketone based resin (trade name: HILAC 110H) | 10.0 wt % |
| stringiness imparting agent (trade name: POLYVINYL PYRROLIDONE K-90) | 0.5 wt % |
| water | 5.0 wt % |
| phosphate based surfactant (trade name: PHOSPHANOL RE-610) | 2.0 wt % |

Examples of the present invention will be described. For the ink composition for oil-based ballpoint pens of Example 1, using ethylene glycol monophenyl ether as an organic solvent, AIZEN SPILON BLACK GMH-S (manufactured by Hodogaya Chemical Co., Ltd.) and VALIFAST VIOLET 1701 (manufactured by Orient Chemical Industries Co., Ltd.) as a dye, and carbon black dispersed in a nonionic surfactant (trade name: SORBON T-85 manufactured by Toho Chemical Industry Co., LTD.) as a pigment, predetermined amounts of these components were accurately measured, and stirred by a dispersion stirrer at an elevated temperature of 60° C. for 6 hours to obtain a uniform solution A.

Then, predetermined amounts of ethylene glycol monoethyl ether, ketone based resin (trade name: HIGHRAC 110H manufactured by Hitachi Chemical Co., Ltd.) as a thickener, POLYVINYL PYRROLIDONE K-90 (manufactured by Wako Pure Chemical Industries Co., Ltd.) as a stringiness imparting agent, water and phosphate based surfactant (trade name: PHOSPHANOL RE-610 manufactured by Toho Chemical Industry Co., LTD.) were accurately measured, and stirred by the dispersion stirrer at an elevated temperature of 30° C. for 3 hours to obtain a uniform solution B.

Furthermore, the solution A and the solution B were stirred and thereby mixed uniformly by the dispersion stirrer for one hour with both the solutions being kept at 30° C. to obtain an ink for oil-based ballpoint pens that was black in both handwriting and outward appearance.

Example 2

Operations were performed in the same manner as in Example 1, except that diethylene glycol monoethyl ether being a solvent in the solution B was changed to ethylene glycol monoethyl ether to prepare the composition shown in Table 1, to obtain an ink for oil-based ballpoint pen that was black in both handwriting and outward appearance.

Example 3

Operations were performed in the same manner as in Example 1, except that the dye and pigment as a colorant were changed to a red system, ether to prepare the composition shown in Table 1 to obtain an ink for oil-based ballpoint pen that was red in both handwriting and outward appearance.

Example 4

Operations were performed in the same manner as in Example 3, except that diethylene glycol monoethyl ether being a solvent in the solution B was changed to ethylene glycol monoethyl ether to prepare the composition shown in Table 1, to obtain an ink for oil-based ballpoint pen that was red in both handwriting and outward appearance.

Example 5

Operations were performed in the same manner as in Example 3, except that the content of water in the solution B was considerably increased to prepare the composition shown in Table 1, to obtain an ink for oil-based ballpoint pen that was red in both handwriting and outward appearance.

(Note)

(1) ink viscosity: B8H Viscometer manufactured by Tokyo Instruments Co, Ltd. was used to measure the viscosity at a rotation speed of 10 rpm of the No. 2 rotor under a circumstance of 20° C.

(2) handwriting fastness properties: rated as ◯ if compliant with the light resistance and water resistance of handwriting defined in the ISO/FDIS 12757-2, and rated as X if not compliant.

(3) outward color visibility: rated as ◯ if the ink contained in a transparent polypropylene ink tank has a desired ink color, and rated as X if the ink cannot be identified clearly.

(4) writing tactility: in handwriting evaluation, capable of smoothly writing with low writing pressure and very satisfactory . . . ◯ slightly poor . . . Δ incapable of writing with low writing pressure and lacking in smoothness . . . X.

(5) handwriting density: in handwriting evaluation apparently dense and satisfactory handwriting . . . ◯ slightly poor . . . Δ poor in writing density . . . X.

(6) handwriting chafing characteristics: when writing is performed at a temperature of 23±2° C. and a humidity of 50±5% RH, using as a sample a ballpoint pen in which where the diameter of a point ball of a ballpoint pen tip is X (mm) and the ink consumption per 100 m of writing duration is Y (mg), the requirement of Y≧60X is satisfied, handwriting is fully dried in 3 seconds, and no chafing contaminations occur . . . ◯-

TABLE 1

| | | | | Examples | | | | |
|---|---|---|---|---|---|---|---|---|
| | | | | 1 | 2 | 3 | 4 | 5 |
| solution A | colorant | dye | AIZEN SPILON BLACK GMH-S | 15.0 | 15.0 | — | — | — |
| | | | VALIFAST VIOLET 1701 | 15.0 | 15.0 | — | — | — |
| | | | VALIFAST RED 1360 | — | — | 12.0 | 12.0 | 12.0 |
| | | | AIZEN SPILON YELLOW C-GNH | — | — | 3.0 | 3.0 | 3.0 |
| | | pigment | carbon black | 2.0 | 2.0 | — | — | — |
| | | | quinacridone based pigment (Pig No. Red 122) | — | — | 5.0 | 5.0 | 5.0 |
| | | dispersant | nonionic surfactant (polyoxyethylene sorbitan trioleate) | 1.5 | 1.5 | 3.0 | 3.0 | 3.0 |
| | solvent (c) | | ethylene glycol monophenyl ether | 24.5 | 19.5 | 29.5 | 19.5 | 15.0 |
| solution B | solvent (a) | | water | 5.0 | 5.0 | 5.0 | 5.0 | 12.0 |
| | solvent (b) | | diethylene glycol monoethyl ether | 24.5 | — | 20.0 | — | 17.5 |
| | | | ethylene glycol monoethyl ether | — | 19.5 | — | 20.0 | — |
| | thickener | | ketone based resin | 10.0 | 20.0 | 20.0 | 30.0 | 30.0 |
| | stringiness imparting agent | | Polyvinyl Pyrrolidone K-90 | 0.5 | 0.5 | 0.5 | 0.5 | 0.5 |
| | anti-corrosive wetting agent | | phosphate based surfactant (alkyl phenol ether phosphate) | 2.0 | 2.0 | 2.0 | 2.0 | 2.0 |
| | | | ink viscosity | 1,200 | 2,800 | 1,500 | 3,100 | 1,300 |
| | | | handwriting fastness properties | ◯ | ◯ | ◯ | ◯ | ◯ |
| | | | outward color visibility | ◯ | ◯ | ◯ | ◯ | ◯ |
| | | | writing tactility | ◯ | ◯ | ◯ | ◯ | ◯ |
| | | | handwriting density | ◯ | ◯ | ◯ | ◯ | ◯ |
| | | | handwriting chafing characteristics | ◯ | ◯ | ◯ | ◯ | ◯ |

Comparative Examples 1 to 5

Operations were performed in the same manner as in Example 1, except that the ink compositions were those shown in Table 2, to obtain inks for oil-based ballpoint pens.

handwriting is dried in 3 to 10 seconds, no chafing contaminations occur . . . Δ handwriting is not fully dried even after 10 second or longer, and chafing contaminations occur . . . X.

TABLE 2

| | | | Comparative Examples | | | | |
|---|---|---|---|---|---|---|---|
| | | | 1 | 2 | 3 | 4 | 5 |
| solution A | colorant | dye | AIZEN SPILON BLACK GMH-S | — | — | — | 15.0 | 15.0 |
| | | | VALIFAST VIOLET 1701 | — | — | — | 15.0 | 15.0 |
| | | | VALIFAST RED 1360 | 24.0 | — | 12.0 | — | — |
| | | | AIZEN SPILON YELLOW C-GNH | 6.0 | — | 3.0 | — | — |
| | | pigment | carbon black | — | 30.0 | — | 2.0 | 2.0 |
| | | | quinacridone based pigment (Pig No. Red 122) | — | — | 5.0 | — | — |
| | dispersant | | nonionic surfactant (polyoxyethylene sorbitan trioleate) | — | 15.0 | — | 1.5 | 1.5 |
| | | | polyvinyl butyral resin | — | — | 12.0 | — | — |
| | solvent (c) | | ethylene glycol monophenyl ether | 21.3 | 30.0 | 25.3 | 21.0 | 26.0 |
| solution B | solvent (a) | | water | 5.0 | 5.0 | 5.0 | 5.0 | — |
| | solvent (b) | | diethylene glycol monoethyl ether | — | — | — | — | — |
| | | | ethylene glycol monoethyl ether | 21.3 | 7.5 | 25.3 | 20.0 | 26.0 |
| | thickener | | ketone based resin | 20.0 | 10.0 | 10.0 | 20.0 | 12.0 |
| | stringiness imparting agent | | Polyvinyl Pyrrolidone K-90 | 0.5 | 0.5 | 0.5 | 0.5 | 0.5 |
| | anti-corrosive wetting agent | | phosphate based surfactant (alkyl phenol ether phosphate) | 2.0 | 2.0 | 2.0 | — | 2.0 |
| | | | ink viscosity | 1,300 | 1,800 | 3,000 | 2,800 | 2,600 |
| | | | handwriting fastness properties | X | X | ○ | ○ | ○ |
| | | | outward color visibility | X | X | ○ | ○ | ○ |
| | | | writing tactility | ○ | X | X | X | X |
| | | | handwriting density | Δ | X | X | X | X |
| | | | handwriting chafing characteristics | ○ | X | X | X | X |

EVALUATION

In Comparative Example 1, the colorant was composed of only a red dye. The red dye is particularly poor in light resistance. The outward appearance of the ink in the ink tank was blackish, and was hard to be identified as a red ink.

In Comparative Example 2, a black pigment was used alone as a colorant. The ink in the tip was poor in stability with time, and writing was no longer possible due to agglomeration of the pigment.

In Comparative Example 3, a polyvinyl butyral resin (trade name: SREC BL-1 manufactured by Sekisui Chemical Co., Ltd.) was used as a pigment dispersant instead of the nonionic surfactant. Handwriting fastness properties and outward appearance color visibility were improved as an effect of using a pigment as a colorant, but due to an increase in viscosity by dry-up of the ink in the tip, satisfactory handwriting could not be obtained, and writing tactility was degraded.

In Comparative Example 4, the phosphate based surfactant was not employed as an anti-corrosive wetting agent. Satisfactory handwriting could not be obtained due to bad rotation of a ball mounted on the tip, and considerable skipped lines and thin spots occurred.

In Comparative Example 5, the solvent did not contain water. Satisfactory handwriting could not be obtained due to lack of wetting capability as in the case of Comparative Example 4. Furthermore, handwriting drying characteristics were degraded, and therefore handwriting chafing characteristics were also compromised. The ink composition of the invention has an effect of providing excellent handwriting fastness properties, improved writing feeling and handwriting densities, adequate outward appearance color recognizability, and excellent stability with time.

What is claimed is:

1. An ink composition for oil-based ballpoint pens comprising: a solvent, a colorant and an anti-corrosive wetting agent; wherein the solvent is a water containing water-in-oil-type organic solvent which is comprised of (a) water, (b) organic solvent which dissolves water and is soluble in a water-insoluble polar solvent, and (c) a water-insoluble polar solvent, the colorant is a combination of a dye and a pigment, the pigment being dispersed in the ink with a nonionic surfactant, and the anti-corrosive wetting agent is a phosphate based surfactant.

2. The ink composition for oil-based ballpoint pens according to claim 1, wherein the dye is a basic dye, or a salt-forming dye comprised of a basic dye and an organic acid.

3. The ink composition for oil-based ballpoint pens according to claim 1, wherein the viscosity of the ink at 20° C. is 100 to 5,000 mPa·S.

4. The ink composition for oil-based ballpoint pens according to any one of claims 1 to 3, wherein the content of phosphate based surfactant is 0.1 to 5.0 wt % based on the total amount of ink composition.

5. The ink composition for oil-based ballpoint pens according to any one of claims 1 to 3, wherein the solvent is comprised of (a) 3.0 to 15.0 wt % of water based on the total amount of ink composition, (b) 5.0 to 40.0 wt % of organic solvent based on the total amount of ink composition, which dissolves water and is soluble in a water-insoluble polar solvent, and (c) a water-insoluble polar solvent as the rest, wherein the total amount of (a) the water, (b) the organic solvent, which dissolves water and is soluble in a water-insoluble polar solvent, and (c) the water-insoluble polar solvent is 30.0 to 75.0 wt % based on the total amount of the ink composition.

6. The ink composition for oil-based ballpoint pens according to claim 5, wherein the organic solvent which dissolves the water and is soluble in the water-insoluble polar solvent is the organic solvent of which the vapor pressure at 20° C. is 0.5 mmHg or greater.

7. An oil-based ballpoint pen having a point ball of a ballpoint pen tip and using the ink composition for oil-based ballpoint pens according to any one of claims 1 to 3, a formulae of a relationship between X and Y is Y≧60 X, wherein X is a ball diameter of the point ball (mm) and Y is an ink consumption weight per writing distance of 100 m (mg).

* * * * *